United States Patent
Brazeau

(10) Patent No.: US 9,248,973 B1
(45) Date of Patent: Feb. 2, 2016

(54) SHUFFLING INVENTORY HOLDERS

(71) Applicant: Amazon Technologies, Inc., Seattle, WA (US)

(72) Inventor: Jeremiah David Brazeau, Hudson, NH (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/800,138

(22) Filed: Jul. 15, 2015

Related U.S. Application Data

(63) Continuation of application No. 14/231,692, filed on Mar. 31, 2014, now Pat. No. 9,111,251.

(51) Int. Cl.
  G06F 7/00 (2006.01)
  B65G 43/00 (2006.01)
  G05B 15/02 (2006.01)

(52) U.S. Cl.
  CPC .............. *B65G 43/00* (2013.01); *G05B 15/02* (2013.01)

(58) Field of Classification Search
  None
  See application file for complete search history.

(56) References Cited

U.S. PATENT DOCUMENTS

| | | | |
|---|---|---|---|
| 8,996,157 B2 * | 3/2015 | Collin | B65G 1/0485 700/213 |
| 2009/0185884 A1 | 7/2009 | Wurman et al. | |
| 2013/0054005 A1 * | 2/2013 | Stevens | G06Q 10/087 700/216 |
| 2013/0173049 A1 * | 7/2013 | Brunner | B65G 1/1378 700/216 |
| 2013/0246229 A1 | 9/2013 | Mountz et al. | |
| 2014/0100998 A1 | 4/2014 | Mountz et al. | |
| 2014/0214234 A1 | 7/2014 | Worsley | |

* cited by examiner

*Primary Examiner* — Yolonda Cumbess
(74) *Attorney, Agent, or Firm* — Lee & Hayes, PLLC

(57) ABSTRACT

An inventory system has mobile drive units that freely and independently move about a facility to transport inventory holders. The mobile drive units may operate through communications with other drive units, or under a more centralized control of a management module. For various operating scenarios, the mobile drive units are directed to shuffle the inventory holders in a manner that minimizes travel of the mobile drive units, thereby improving overall system efficiency. One or more single mobile drive units may be used to transport inventory holders to and from a region, and one or more other mobile drive units may be used to reposition or slide each of the inventory holders back and forth within the region to efficiently place inventory holders before an operator on an as-needed basis.

20 Claims, 14 Drawing Sheets

SHUFFLING INVENTORY HOLDERS

This application is a continuation of, and claims the benefit under 35 U.S.C. §120, to U.S. patent application Ser. No. 14/231,692 filed Mar. 31, 2014, of the same title, the entire contents and substance of which are hereby incorporated by reference herein as is fully set for the below.

BACKGROUND

Modern inventory systems, such as those in mail-order warehouses, supply chain distribution centers, airport luggage systems, and custom-order manufacturing facilities, face significant challenges in responding to requests for inventory items. As inventory systems grow, the challenges of simultaneously completing a large number of packing, storing, and other inventory tasks become non-trivial. For instance, in product distribution centers (e.g., fulfillment centers), vast quantities of products are processed for shipment to consumers traditionally using manual labor and/or mechanical handling equipment (e.g., conveyor systems, forklifts, etc.).

Inventory systems that are tasked with responding to large numbers of diverse inventory requests typically exhibit inefficient utilization of system resources, including space, equipment, and manpower. This can, in turn, result in lower throughput, unacceptably long response times, an ever-increasing backlog of unfinished tasks, and generally poor system performance.

Additionally, expanding or reducing the size or capabilities of many inventory systems requires significant changes to existing infrastructure and equipment. As a result, the cost of incremental changes to capacity or functionality may be prohibitively expensive, thereby limiting the ability of the system to accommodate fluctuations in system throughput.

Accordingly, there remains a need for improved techniques for handling products in a distribution center that reduce the potential for damaged products and increases efficiency in delivering products to a consumer, while minimizing operating costs.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3A presents a shuffle process and FIG. 3B shows a replacement process where completed inventory holders are removed from the station and new inventory holders added to the station.

DETAILED DESCRIPTION

Figure 1:
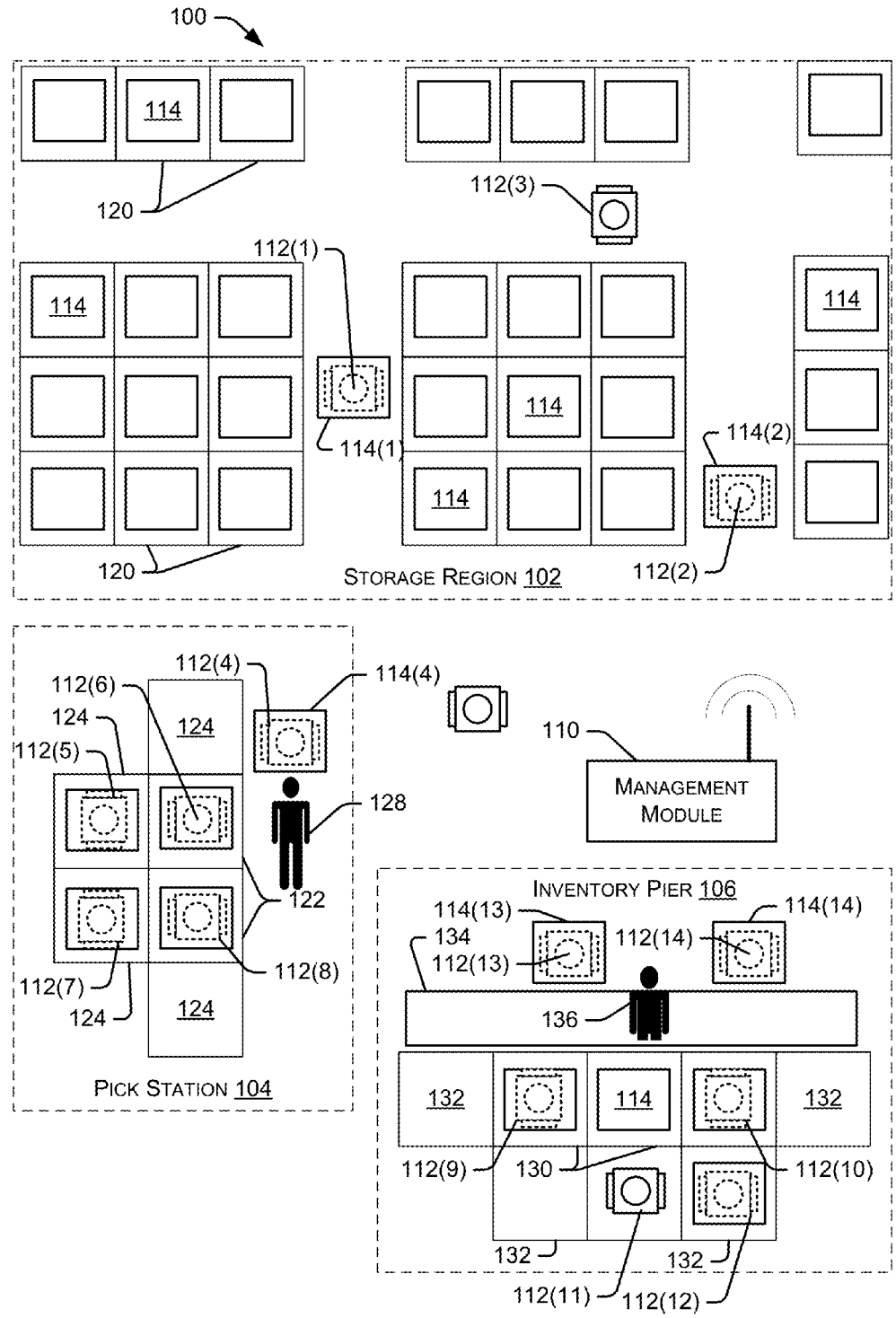
FIG. 1 illustrates an inventory system having multiple regions and mobile drive units that carry inventory holders about the regions.

Inventory systems of the present disclosure utilize one or more mobile drive units to automatically retrieve inventory holders from a materials handling facility or warehouse storage. The inventory holders may be entire racks of shelves, with each shelf having bins for various inventory items. Mobile drive units may be self-powered robotic devices configured to move freely about the warehouse. Racks may be transported by mobile drive units to various stations for performing inventory operations. A station may include a human operator and/or automated equipment to remove desired inventory items from the inventory holders and complete orders. In some operations, the items are removed from inventory holders and placed on order holders, which too can be maneuvered by the mobile drive units.

The inventory systems coordinate the mobile drive units to deliver inventory holders to the station in a timely and efficient manner for easy access by the operators. The mobile drive units move the inventory holders to and from stations throughout the facility in response to prioritized inventory tasks, such as order fulfillment tasks, restocking tasks, storage tasks, counting tasks, and so forth. For instance, as one example, orders may be received and queued, where each order defines certain items to be packaged and shipped. As the orders are received, inventory tasks are prioritized and assigned to mobile drive units to retrieve and deliver inventory holders with the requested items to the operators for order fulfillment. In some situations, to fulfill the orders, an operator may need to take items from multiple inventory holders. Over the course of multiple orders, the operator may want items from the same inventory holders at different times. For example, the operator may pick items from one or more holders for a first order, then items from one or more holders for a second order, and so on, where some of the inventory holders are repeatedly used for multiple orders. In such cases, there may be several inventory holders kept in the proximity of the operator and shuffled in and out to the operator on an as-needed basis.

More specifically, to efficiently present the inventory holders just in time to the operator, the inventory systems employ a shuffle process to efficiently move the inventory holders at a station. According to this process, one or more mobile drive units continuously reposition the inventory holders between primary locations where the operator can access the items and temporary secondary locations proximal to the primary locations. That is, during a first order, the mobile drive units may place one inventory holder in a primary location next to the operator at one moment, then shuffle it to a temporary secondary location while moving a new inventory holder into the primary location. Later, during another order, the mobile drive units may move the new inventory holder back to the same or different temporary location while repositioning the original inventory holder back in the primary location beside the operator. The inventory holders are kept close to the operator but shuffled in and out of the primary locations as needed. In this manner, the inventory holders need not be removed a greater distance away (such as back to storage) after one access by the operator.

Throughout this document, reference is made to inventory holders as the racks that are moved about by the mobile drive units. It is noted that inventory holders are generally structures that hold inventory items, items that are part of an order, packaging elements for the orders, and essentially any other item or element that might be used by the inventory and fulfillment system. As such, inventory holders may also be referred to as holders, order holders, container holders, bins, and so forth.

The ability for mobile drive units to transport inventory items to a station for performing inventory operations rather than or in addition to workers manually retrieving inventory items from stationary racks may vastly increase efficiency and productivity of the inventory system. For example, by utilizing mobile drive units, an inventory system may be capable of fulfilling more orders per hour than previous solutions. Mobile drive units may move about the warehouse and/or retrieve inventory holders in response to commands and/or instructions received from an automated guidance system. For example, a management module may control administration and coordination of certain elements and/or tasks within the warehouse. The management module may receive orders for inventory items in the warehouse and coordinate task assignments for fulfilling the orders, including providing instructions to mobile drive units to transport racks with requested inventory items to an inventory station for completion of an order. The management module may also provide guidance at the inventory station for how the order is to be assembled.

To use a simple illustration, in a distribution warehouse for an office supply store, the management module may receive an order for a printer, several ink cartridges, and a box of paper. The management module may determine the locations of these items within the racks of storage in the distribution warehouse. The items may, for instance, be on the shelves of three separate racks. The management module may issue tasks for three different mobile drive units to retrieve each rack respectively holding the printer, ink cartridges, and paper, and for the mobile drive units to transport the racks holding those items to an inventory station where the three items may be picked from the racks and packed into a box for shipment. In doing so, the management module may coordinate the various tasks such that all of the orders received by the management module are fulfilled in an efficient manner.

Orchestrating movement of the mobile drive units is non-trivial. This is particularly true at the pick station where human and/or mechanical pickers retrieve items from the inventory holders. The mobile drive units are continuously moving the inventory holders into and away from the pick stations to place the appropriate items near the pickers at the right time. For existing pick stations, current inventory systems face a challenge of increasing the lines per hour (lph) so that pickers may retrieve more items per hour, thereby improving efficiency and throughput of the inventory system.

The inventory systems described herein utilize efficient shuffling techniques in which one or more mobile drive units reposition the inventory holders in ways that present appropriate items at the pick station at the correct time, while minimizing the amount of movement each mobile drive unit makes to reposition the inventory holders. The efficient shuffling techniques may be used at various locations or stations of the inventory system, including at pick stations, deep storage locations, and high volume inventory piers. One example shuffling technique involves defining multiple locations at a pick station for arranging inventory holders in priority order. Such locations may include a primary set of pick locations in which the inventory holders are positioned next to the picker and a secondary set of staging locations adjacent to, but spaced from, the pick locations. One or more mobile drive units may then be used to efficiently deliver inventory holders from storage to the staging locations and remove the recently-picked inventory holders from the pick locations to the staging locations prior to returning them to storage. When the inventory holders reside at the station, one or more mobile drive units shuffle the inventory holders back and forth between the pick locations and the staging locations. In this manner, the items of immediate interest are made available to the picker in an efficient manner. In the described implementations, one or multiple mobile drive units are used to perform the shuffling techniques at the pick station.

For instance, suppose a pick station has two pick locations close to the picker to hold two inventory holders. Each pick location has an area footprint on the warehouse floor to accommodate an inventory holder at rest. Two inventory holders holding the current items to be picked by the picker(s) are placed in the first and second pick locations. Adjacent or proximal to the primary pick locations are multiple secondary or staging locations to hold on-deck inventory holders that hold the next items to be picked by the picker after the items on the first and secondary inventory holders have been picked. The secondary locations are proximal to the pick locations, but spaced away from the picker, and hence are not as close to the picker as the pick locations. Suppose, for example, that two on-deck inventory holders—the third and fourth inventory holders—are currently situated at the secondary locations next to the first and second inventory holders in the primary pick locations.

According to one shuffle implementation, when the picker has finished with the first inventory holder, a first mobile drive unit repositions the first inventory holder from a first pick location to an unoccupied secondary location near the primary pick location. Thereafter, a second mobile drive unit repositions one of the on-deck or third inventory holder from a secondary location to the first pick location vacated by the first inventory holder. Concurrently, or sequentially, when the picker has finished with the second inventory holder at the second pick location, a third mobile drive unit repositions the second inventory holder from the second pick location to another unoccupied secondary location. Thereafter, a fourth mobile drive unit repositions the other on-deck or fourth inventory holder from another secondary location to the second pick location vacated by the second inventory holder. This orchestrated repositioning of the inventory holders keeps items readily available to the picker, while minimizing the amount of wasteful travel time by the mobile drive units.

As the picker finishes picking items from the third and fourth inventory holders that currently reside in the two pick locations, the mobile drive units shuffle all four inventory holders back so that the first and second inventory holders are once again in the pick locations and the third and fourth inventory holders are returned to staging locations. For instance, the second mobile drive unit repositions the third inventory holder from the first pick location back to its original or another unoccupied secondary location. The first mobile drive unit then repositions the first inventory holder from the secondary location back into the first pick location, thereby returning the first inventory holder to the picker.

Similarly, the fourth mobile drive unit repositions the fourth inventory holder from the second pick location back to its original or another unoccupied secondary location. The third mobile drive unit repositions the second inventory holder from the secondary location back to the second pick location to return the second inventory holder to the picker. This shuffling may be repeated to alternate the inventory holders in front of the picker so that the items of immediate interest are made available to the picker just in time.

As noted above, other mobile drive units may be used from time-to-time to deliver new inventory holders to the pick station, initially depositing them at unoccupied secondary locations, and remove the completed inventory holders from the pick station to storage or other regions of the warehouse.

This and other examples of operating an inventory system are described below. The techniques discussed herein may be implemented in many different ways, by many different systems. Various representative implementations are provided below with reference to the figures.

FIG. 1 shows one illustrative example of an inventory system 100 that may be used to implement a technique for efficient shuffling of inventory holders. The inventory system 100 may be arranged in a facility or warehouse (e.g., distribution facility, fulfillment center, etc.) that is logically organized into areas or regions associated with various functions. In the illustrated example, the warehouse includes a storage region 102, a pick station 104, and an inventory pier 106. In practice, depending upon the size of the inventory system 100, the warehouse may hold more than one of the storage regions 102, pick stations 104, and inventory piers 106, or the warehouse may be configured without the storage region 102, or the pick station 104, or the inventory pier 106.

The inventory system 100 includes a management module 110, multiple mobile drive units 112, and inventory holders 114. Only some of the inventory holders 114 are shown referenced with the number 114 for ease of illustration. The mobile drive units 112 are independent, self-powered robotic devices that may move freely about the warehouse, under their own direction or through coordination by the management module 110. In alternative implementations, the mobile drive units 112 may be configured to move inventory holders 114 along tracks, rails, cables, or other guidance elements traversing the associated workspace. In such implementations, mobile drive units 112 may receive power through a connection to the guidance elements, such as a powered rail. In some embodiments, the inventory system 100 may include two or more different types of mobile drive units 112 having various capabilities and specifications. Moreover, although illustrated and discussed as though mobile drive units 112 are a particular type of mobile drive unit, mobile drive units 112 may refer to various types of mobile drive units. For example, one type of mobile drive unit 112 may be operable to transport relatively large, heavy, or bulky inventory items. Another type of mobile drive unit 112 may be operable to transport relatively lighter and/or more compact inventory items. Mobile drive units 112 may accordingly have various power trains, load capacities, and other appropriate specifications to transport particular inventory items in various types of the inventory holders 114 within the inventory system 100.

The mobile drive units 112 may be used at various times to transport the inventory holders 114 around the warehouse among the regions. For instance, the mobile drive units 112 may transport the inventory holders 114 between the storage region 102 and the pick station 104 or inventory pier 106.

Each inventory holder 114 may be implemented as a physical structure to hold various inventory items. The inventory holder 114 has a physical length, width, and height that may be standardized or varied within the inventory system. As used herein, the inventory holder 114 may be configured to hold essentially any type or size of item or be used for any number of purposes, including, but not limited to, carrying pallets, storing shipping supplies, holding garbage, supporting empty boxes waiting for inventory, supporting filled boxes with items once orders are fulfilled, and so on. Furthermore, as used herein, inventory holders also include holders for other types of products or items and hence include order holders.

In one implementation, the inventory holder 114 may be formed as a rack having multiple shelves to support various types of inventory items. For instance, the inventory holders 114 may include multiple storage bins with each storage bin capable of holding a different type of inventory item. The inventory holders 114 are capable of being carried, rolled, or otherwise moved by the mobile drive units 112. Each inventory holder 114 may have a plurality of faces, and each bin may be accessible through specific faces. The rack is free-standing when at rest, but can be lifted and moved by the mobile drive units 112. The mobile drive units 112 may be configured to rotate inventory holders 114 at appropriate times to present particular faces of inventory holders 114 and the associated bins to an operator or other components of inventory system 10. One example is described below in more detail with reference to FIG. 2.

As used herein, inventory holders may also be referred to as holders, order holders, container holders, bins, and so forth. Order holders may, for example, be racks of shelving that are configured to hold boxes or containers that will be used to fill orders for inventory items. Each box or container may be associated with a particular order. For instance, an order holder may store a cardboard box that is to be used for shipping an order for several ink cartridges and several reams of paper. In one operation, order holders needing such items may visit positions along the inventory pier corresponding to inventory holders storing inventory items needed by the orders. Operators may remove items from the inventory holders and place them into appropriate boxes or containers in the order holder. If necessary, the order holder may then be taken to an inventory station to fill items remaining on the orders in the boxes or containers of the order holder.

The mobile drive units 112 transport the inventory holders 114 among any number of predefined physical locations on the warehouse floor. For illustration purposes, rectangular areas are depicted in FIG. 1 to designate physical locations or area footprints within the facility that may be used to place an associated inventory holder. Each location may accommodate an inventory holder 114, and perhaps be sized with additional area so that the inventory holder is contained entirely within the location. That is, each inventory holder 114 may stand at rest within the area of the floor reserved or otherwise predefined as a location. The storage region 102, for example, has multiple storage locations 120 arranged in sets of nine storage locations with aisles between the sets. An inventory holder 114 may be placed within a corresponding storage location 120 until needed by a picker at the pick station 104 or inventory pier 106. In other layouts, there may be more or less than nine storage locations per zone in the storage region 102. Further, while the locations are shown as rectangular areas side-by-side for ease of illustration, other arrangements are possible, with different shaped footprints (e.g., square, circle, hexagon, etc.) and varying layouts other than side-by-side.

One or more mobile drive units 112 are provided in the storage region 102 to shuffle inventory holders 114 among the storage locations 120 and to transport the inventory holders between the storage region and other regions in the warehouse. Two loaded drive units 112(1) and 112(2) are shown in the storage area 102 carrying associated inventory holders 114(1) and 114(2), respectively, down aisles between the sets of predefined storage locations 120. The mobile drive units 112(1) and 112(2) are shown in dashed lines as the units reside beneath the associated inventory holders that are being transported. An unloaded drive unit 112(3) is also shown moving through an aisle between the predefined storage locations 120.

The pick station region 104 is designed with multiple primary locations 122 and multiple secondary locations 124 to accommodate associated resting inventory holder 114. In FIG. 1, the pick station 104 has six locations arranged about the pick station. There are two primary locations 122 that are positioned closest or adjacent to a picking area in which a picker 128 picks inventory items from the inventory holders 114 and loads them into boxes or containers supported by another inventory holder 114(4) mounted on a mobile drive unit 112(4). In this illustration, the picker 128 is a human, although the picker may alternatively or additionally involve a mechanical picking apparatus. Four secondary or staging locations 124 are mapped adjacent to the primary pick locations 122. The staging locations 124 temporarily hold inventory holders 114 on the way to and from the pick locations 122 of the pick station 104. It is noted that six locations are merely representative, and that pick stations 104 may be designed with more or fewer than six locations and that the secondary locations may be spaced more randomly around the pick locations than as shown.

Four mobile drive units 112(5)-112(8) are shown at the pick station 104. The mobile drive units 112(5)-112(8) may be essentially dedicated to the pick station to shuffle inventory holders 114 among the primary pick and secondary staging locations 122 and 124 of the pick station 104 according to the techniques described herein. In such implementations, these dedicated mobile drive units may be referred to as local drive units. Alternatively, the mobile drive units 112(5)-112(8) may be directed to the pick station 104 on an as-needed basis. In some implementations, one or more additional mobile drive units may be used to carry inventory holders 114 to and from the staging locations 124. In this illustration, the mobile drive units are shown beneath associated inventory holders positioned in the two primary pick locations 122 and two of the staging locations 124.

The inventory pier 106 facilitates higher volume inventory. In many inventory systems, a small percentage of high velocity and/or high volume inventory are responsible for a large percentage of overall system activity. High velocity inventory may refer to popular inventory that is requested by a large percentage of orders, while high volume inventory may refer to inventory that is requested in large volumes by orders. Volume may refer to the physical amount of cubic space certain inventory items require in the warehouse. High volume inventory items may refer to large or bulky items and/or items that are purchased in large quantities by individual orders. In some inventory systems, for example, the top 1% of inventory items may account for over 20% of overall system activity. Highly popular items may require a correspondingly high use of mobile drive units to transport inventory holders to inventory stations. Similarly, high volume inventory may require relatively more labor to replenish inventory holders storing such items such that breaking down such items into inventory holders may be less efficient than merely using the inventory for orders in the manner it arrives from a wholesaler. A more efficient method of filling orders for such items may be realized using an inventory pier. The inventory pier may store highly popular and/or high volume inventory. Inventory holders that store popular or high volume inventory may be positioned along one side of the inventory pier. The inventory pier may accordingly be configured to include a configurable number of fixed positions for top inventory items. For an example inventory system storing 3,000 unique inventory items, as few as thirty unique inventory items may account for a high percentage of system activity due to high velocity or high volume of such items. Thus, in such an inventory system, the inventory pier may include a sufficient amount of defined areas to store the 30 top inventory items at the inventory pier.

To illustrate, in the office supply example discussed above, paper may be a high volume inventory item and ink cartridges may be a highly popular item. Accordingly, a pallet of paper and an inventory holder storing various ink cartridges may be stationed at the inventory pier. An order for several packages of paper and an ink cartridge may be filled by moving an order holder to a location along the inventory pier opposite to the pallet storing the paper where an operator may transfer the paper to the order holder. The order holder may then move to a location opposite the inventory holder storing the ink cartridges where the same or a different operator may transfer the ink cartridge to the order holder. If the requested printer is not already stored at the inventory pier, a mobile drive unit may transport the order holder to an inventory station, where another mobile drive unit may transport an inventory holder containing the printer so that the order can be filled.

Figure 6:
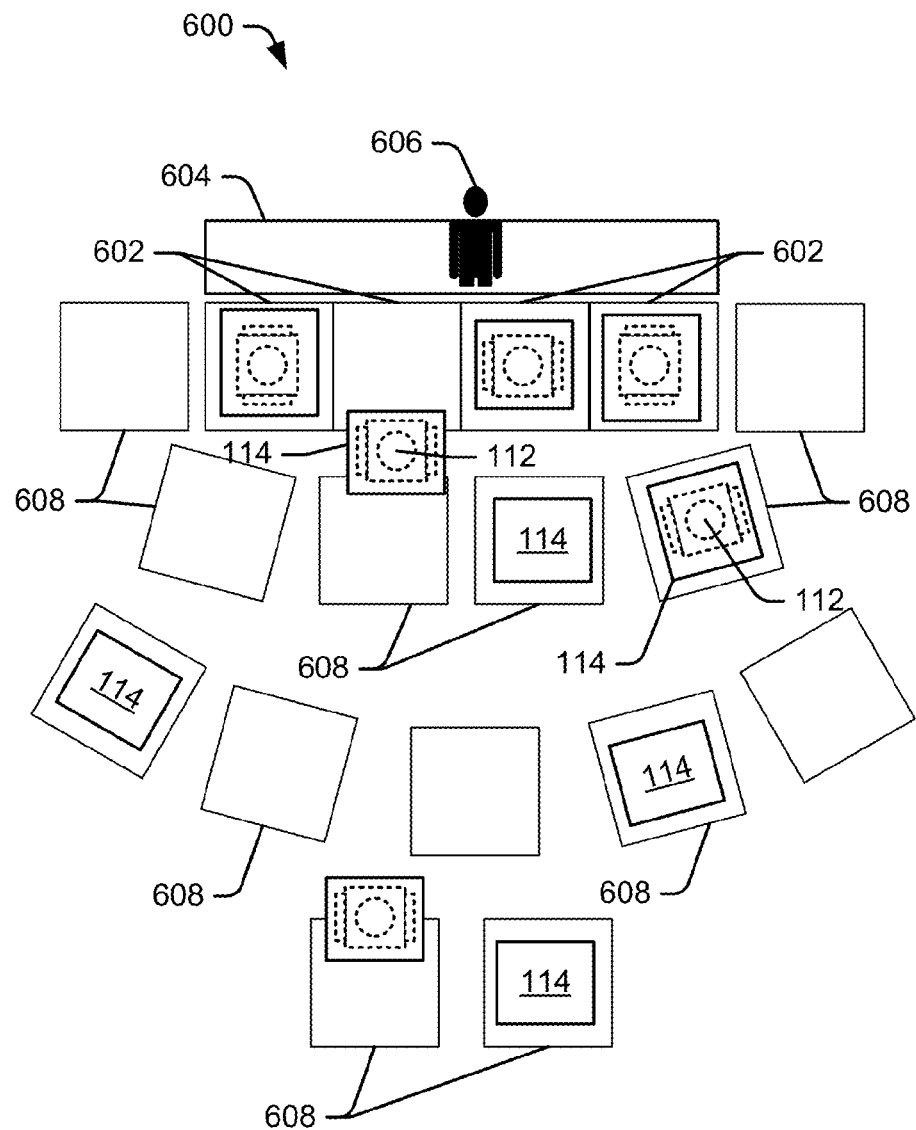
FIG. 6 shows another example scenario at a station where multiple drive units are used to shuffle plural inventory holders among many locations.

In FIG. 1, the inventory pier 106 is shown with multiple designated primary pier locations 130 to accommodate the inventory holders 114. Three primary pier locations 130 are illustrated to accommodate three corresponding holders 114, although there may be more or fewer pier locations per inventory pier 106. Additionally, five secondary pier locations 132 are shown adjacent to the primary locations 130. Another example layout near an inventory pier is shown in FIG. 6.

Multiple mobile drive units 112(9)-112(12) are shown at the inventory pier 106 to shuffle inventory holders 114 among the pier locations 130 and 132 according to the techniques described herein. Two loaded mobile drive units 112(13) and 112(14) are shown at rest next to a pier 134 and holding associated inventory holders 114(13) and 114(14) (or more specifically in this case, order holders) for access by a picker 136 (again, represented as a human although a mechanical device may be used). In this example, the inventory holders 114(13) and 114(14) may be holding packages or containers for order fulfillment, where the picker 136 removes selected items from the inventory holders 114 positioned in primary pier locations 130 and loads the items into order containers on the inventory holders 114(13) and 114(14).

In some implementations, multiple mobile drive units may be used to bring inventory holders to and from the pier locations 130 of the inventory pier 106. Incoming inventory holders may be placed in temporary locations while one or more mobile drive units remove an existing inventory holder that has been recently picked by the picker 136 from a pier location 130. The local mobile drive units 112(9)-112(12) shuffle a new inventory holder with new items of interest into the vacated locations for the picker 136.

In one implementation, the management module 110 orchestrates movement of the mobile drive units 112, directing them to various regions within the warehouse. The management module 110 coordinates transport of the various inventory holders among the regions in the warehouse. Furthermore, the management module 110 may be used to instruct the mobile drive units to perform the shuffle processes within a particular region (e.g., storage region 102, pick station 104, inventory pier 106, etc.). Generally, the shuffle process involves directing a first mobile drive unit to reposition a first inventory holder from its current or first location within the region to a second location within the region that is adjacent or proximal to the first location. Then, a second mobile drive unit repositions a second inventory holder into the first location vacated by the repositioning of the first inventory holder. This enables the second inventory holder to be positioned next to an operator to access that holder (e.g., pick items, stock items, etc.). Thereafter, the second mobile drive unit repositions the second inventory holder back to its original location and the first mobile drive unit repositions the first inventory holder back to the first location. As a result, the first inventory holder is returned next to the operator so the operator can easily access that holder. This back-and-forth shuffle may be repeated as long as needed for the operator to access the first and second inventory holders. Further, the shuffle process may be performed by one mobile drive unit or more than two mobile drive units, and for more than two inventory units. Separately, other mobile drive units may be used to transport the inventory holders away and bring in a new inventory holders.

The management module 110 may use any form of communication to direct the mobile drive units. In one implementation, the management module 110 and the mobile drive units are configured to communicate using wireless technologies, such as a wireless local area network (WLAN). As one example, some embodiments of mobile drive unit 112 may communicate with management module 110 and/or with one another using Wi-Fi (IEEE 802.11), Bluetooth (IEEE 802.15), Infrared Data Association standards, or any other appropriate wireless communication protocol. As another example, in a tracked inventory system 100, tracks or other guidance elements upon which mobile drive units 112 move may be wired to facilitate communication between mobile drive units 112 and the management module 110 and/or other components of inventory system 100.

In addition to directing the mobile drive units, the management module 110 may receive and/or generate requests to initiate any of a number of particular operations involving the mobile drive units 112, inventory holders 114, or other elements of inventory system 100. The management module 110 may select components of inventory system 100 to perform various operations and communicate commands, instructions, and/or other appropriate information to the selected components to facilitate completion of these operations. The management module 110 may receive orders for various inventory items and coordinate and administer various appropriate tasks to fill the orders. For example, an order may specify particular inventory items that have been purchased by a customer and that are to be retrieved from inventory system 100 for shipment to the customer. The management module 110 may receive the orders from any appropriate system and generate task assignments based, in part, on the orders including requests for inventory items. Based on the orders, the management module 110 may identify particular operations to be completed involving inventory items stored or to be stored within inventory system 100.

After generating one or more task assignments, the management module 110 selects appropriate components to complete particular tasks and transmits task assignments to selected components, such as the mobile drive units 112, to trigger completion of the relevant tasks. The relevant components then execute their assigned tasks. Each task assignment defines one or more tasks to be completed by a particular component. These tasks may relate to the retrieval, storage, replenishment, and counting of inventory items and/or the management of mobile drive units 112, inventory holders 114, or other components of inventory system 100. Depending on the component and the task to be completed, a particular task assignment may identify locations, components, and/or actions associated with the corresponding task and/or any other appropriate information to be used by the relevant component in completing the assigned task.

While the appropriate components of inventory system 100 complete assigned tasks, the management module 110 may interact with the relevant components to ensure the efficient use of space, equipment, manpower, and other resources available to inventory system 100. For example, the management module 110 may receive information from the various components of system 100 regarding their current location, state, and/or other characteristics. Based on its knowledge of the location, current state, and/or other characteristics of the various components of inventory system 100 and an awareness of tasks currently being completed, management module 100 can generate tasks, allot usage of system resources, and otherwise direct the completion of tasks by the individual components in a manner that optimizes operation from a system-wide perspective. Moreover, by relying on a combination of both centralized, system-wide management and localized, component-specific decision-making, particular embodiments of inventory system 100 may be able to support a number of techniques for efficiently executing various aspects of the operation of inventory system 100.

As a result, the management module 110 may enhance the efficiency of inventory system 100 and/or provide other operational benefits. For example, the management module 110 may determine particular inventory holders 114 to be stationed at the pick station 104 or inventory pier 106 based on determining that when placed at these locations, overall system activity may be reduced and/or picker efficiency is improved. Similarly, the management module 110 may group orders and assign tasks to fulfill orders such that order fulfillment activities are optimized.

Figure 2:
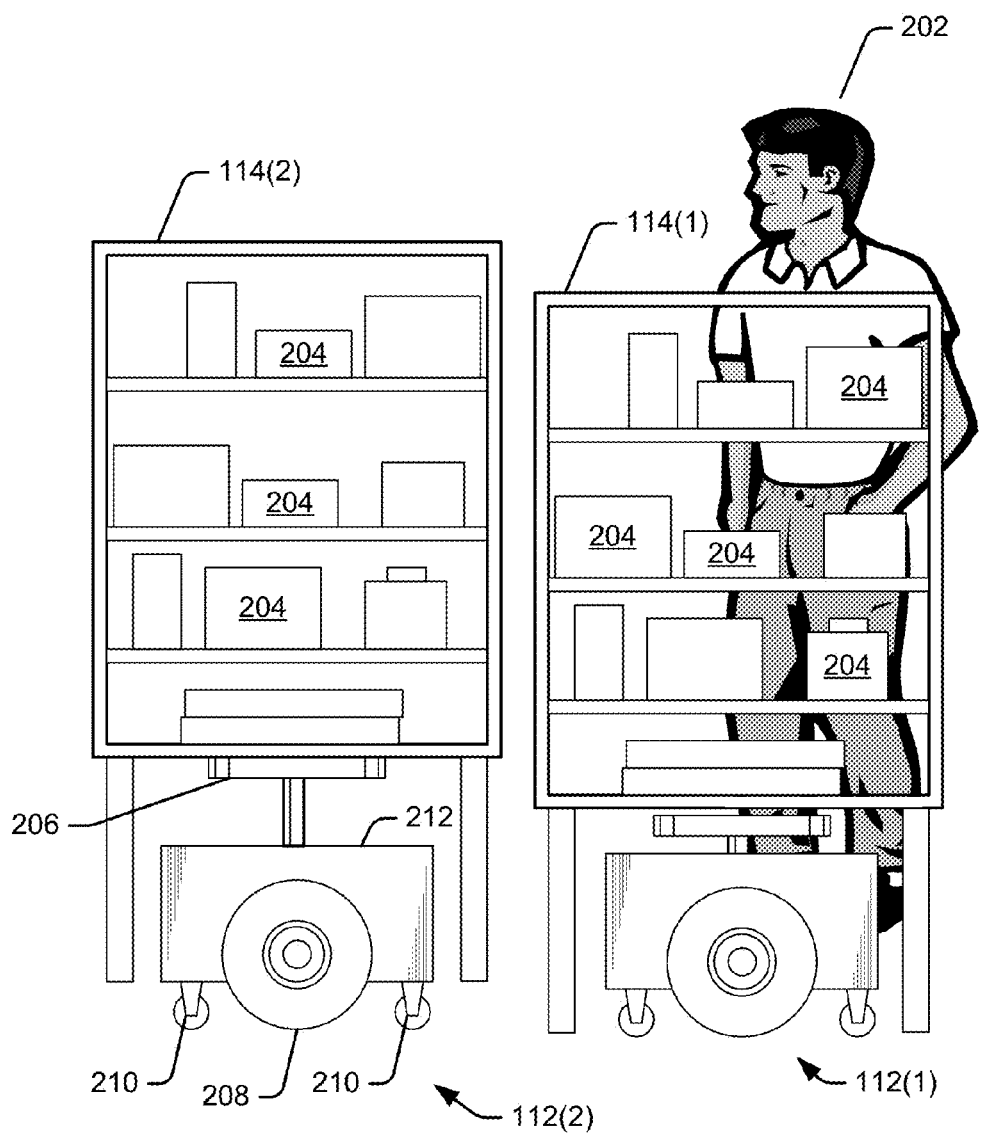
FIG. 2 shows a side view of mobile drive units and inventory holders employed in the inventory system.

FIG. 2 illustrates a side-view illustration of mobile drive units 112 and inventory holders 114 employed in the inventory system 100. In this illustration, one inventory holder 114(1) is at rest in a first location next to a human picker 202. A first mobile drive unit 112(1) is shown beneath the inventory holder 114(1). The inventory holder 114(1) has multiple shelves that support a variety of items 204. The inventory holder 114(1) has open side faces to facilitate stocking of the items 204 onto the shelves and picking of items from the shelves.

The inventory items 204 represent any objects suitable for storage, retrieval, and/or processing in an automated inventory system 100. For example, a given inventory item may represent a single stock-keeping unit (SKU) of a unique inventory item. Thus, inventory items may refer to a particular item and/or may refer to a quantity of items having a particular SKU as appropriate. As one example, the inventory system 100 may represent a retail distribution warehouse that stores bulk inventory items 204 for retail facilities, such as grocery stores and/or merchandise warehouses. As another example, the inventory system 100 may represent an e-commerce warehouse facility, and inventory items 204 may represent merchandise stored in the warehouse facility.

A second mobile drive unit 112(2) is also shown moving a second inventory holder 114(2) into a second location next to the first location. The second mobile drive unit 112(2) is positioning a second inventory holder 114(2) into a location for easy access by the picker 202 (such as at the inventory pier 106) or to place it in an on-deck location to be shuffled to the first location after the picker has completed picking items 204 from the first inventory holder 114(1) (such as at the pick station 104).

The mobile drive units, as represented by units 112(1) and 112(2) in FIG. 2, may transport the inventory holders 114 by docking with and/or coupling to a particular holder and moving the holder while docked. For example, as illustrated, each mobile drive unit 112 transports an associated inventory holder 114 by moving beneath the inventory holder 112 and lifting a docking head 206 that interfaces with a bottom surface (or other portion) of inventory holder 114. The first mobile drive unit 112(1) shows the docking head in a retracted position, allowing the first inventory holder 114(1) to rest on its legs on the floor. In contrast, the second mobile drive unit 112(2) shows its docking head 206 in an extended position to lift the inventory holder 114(2) off of the ground for repositioning during shuffling or for transportation.

The docking head 206 may be controlled by an actuator of mobile drive unit 112 operable to lift inventory holder 114 when docked. The docking head 206 may couple the mobile drive unit 112 to the inventory holder 114 or otherwise support the inventory holder 114 during transportation. The docking head 206 may also include any appropriate features to facilitate coupling to the inventory holder 114. For example, in some embodiments, a high-friction element may form all or a portion of the docking head 206, which abuts a portion of the inventory holder 114 while docked. In such embodiments, frictional forces created between the high-friction element of the docking head 206 and a surface of the inventory holder 114 may induce translational and rotational movement when docked.

The mobile drive unit 112 may utilize the docking head 206 to maneuver the inventory holder 114, such as by lifting, rotating, and/or moving the inventory holder 114 in any appropriate manner. In some implementations, the mobile drive unit 112 may be capable of rotating its docking head to rotate the inventory holder 114 while moving and/or while stopped. In addition or in the alternative, the mobile drive unit 112 may be capable of rotating the docking head 206 independently or as a part of the movement of the mobile drive unit 112 as a whole. For example, the mobile drive unit 112 may rotate the inventory holder 114 as the mobile drive unit 112 executes a turn such that the inventory holder 114 continues to face the original direction of movement.

The mobile drive unit 112 is further equipped with multiple drive wheels 208 and multiple stabilizer wheels 210. A motor internal of a body 212 is used to power the drive wheels 208, while the stabilizer wheels 210 provide stability to the drive unit 112 to maintain balance of the coupled inventory holder 114. Using the drive wheels 208, the mobile drive unit 112 may transport the inventory holder 114 while the docking head is docked to the inventory holder 112 or otherwise move the mobile drive unit 112 when the inventory holder 114 is undocked.

It should be noted that while a particular method of docking with the inventory holder 114 is illustrated, the mobile drive unit 112 may dock with the inventory holder 114 by connecting to, lifting, and/or otherwise interacting with the inventory holder 114 in any other suitable manner so that, when docked, the mobile drive unit 112 is coupled to and/or supports inventory holder 114 and can move inventory holder 114. Further, in some embodiments, potentially some of the mobile drive units 112 may not dock and undock with the inventory holders 114, but rather may remain continually mated with a particular inventory holder 114.

In some implementations, the mobile drive unit 112 may perform a shuffle process to efficiently move inventory holders 114 back and forth to place the appropriate holder adjacent to the picker 202. The mobile drive unit 112 may shuffle the inventory holders according to a pattern programmed into the unit, and/or under the direction of the management module 110. With reference to FIG. 2, suppose the mobile drive units 112(1) and 112(2) are tasked to shuffle the inventory holders 114(1) and 114(2). For discussion purposes, consider a pick station scenario where the picker 202 has completed picking items 204 from the first inventory holder 114(1) and is ready to pick items from the second inventory holder 114(2). According to one shuffle technique, the first mobile drive unit 112(1) moves beneath the first inventory holder 114(1), unless already there, mounts the docking head 206, and lifts the inventory holder off of the ground. The first mobile drive unit 112(1) repositions the first inventory holder 114(1) from its current or first location to another or staging location. Likely, the staging location is adjacent to or somewhere proximal to the current picking location.

The second mobile drive unit 112(2) then moves beneath the second inventory holder 114(2), unless already there, mounts the docking head 206 and lifts the second inventory holder 114(2) off of the ground. The second mobile drive unit 112(2) then repositions the next or second inventory holder 114(2) from its current location (e.g., a second staging location) to the first pick location just vacated by the first inventory holder 114(1) next to the picker 202. The mobile drive unit 112(2) sets down the second inventory holder 114(2) at the first location for the picker 202 to begin picking items 204.

When the picker 202 completes picking items on the second inventory holder 114(2) and wants to pick items once again from the first inventory holder 114(1), the mobile drive units 112(1) and 112(2) shuffle the inventory holders back the starting positions. That is, the second mobile drive unit 112(2) repositions the second inventory holder 114(2) from the first pick location back to a staging location. The first mobile drive unit 114(1) then repositions the first inventory holder 114(1) from the staging location back to the first pick location for easy access by the picker 202.

Other mobile drive units may then be used to transfer the recently-completed inventory holders away from the staging locations and to retrieve new inventory holders and deposit them at the staging locations. In one implementation, the first and second mobile drive units 112(1) and 112(2) remain dedicated to the region to continue to shuffle the two or more inventory holders.

Figure 3A:
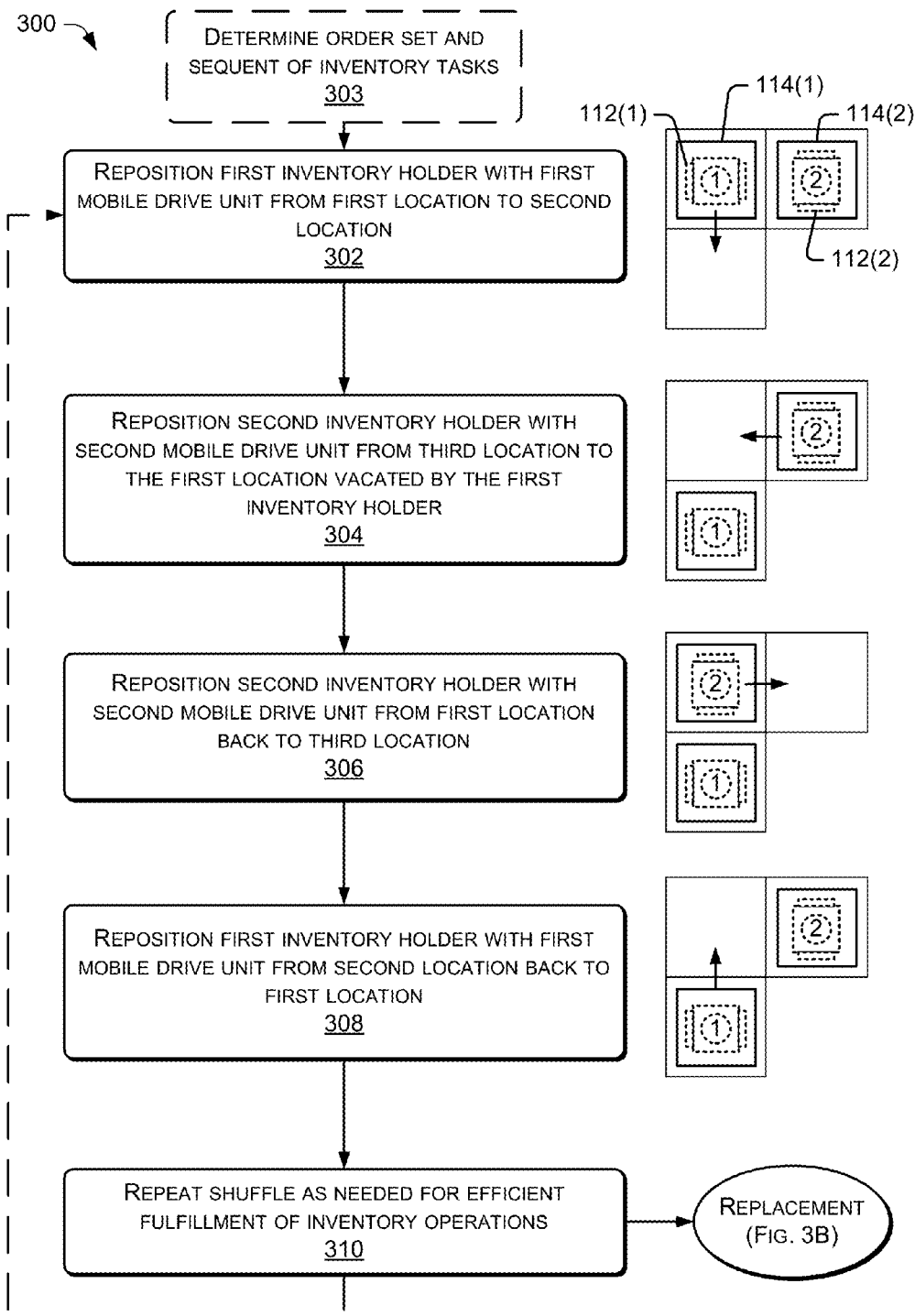
FIGS. 3A and 3B provide a flow diagram illustrating an example process that may be implemented using multiple mobile drive units to shuffle inventory holders among locations at a station.
Figure 3B:
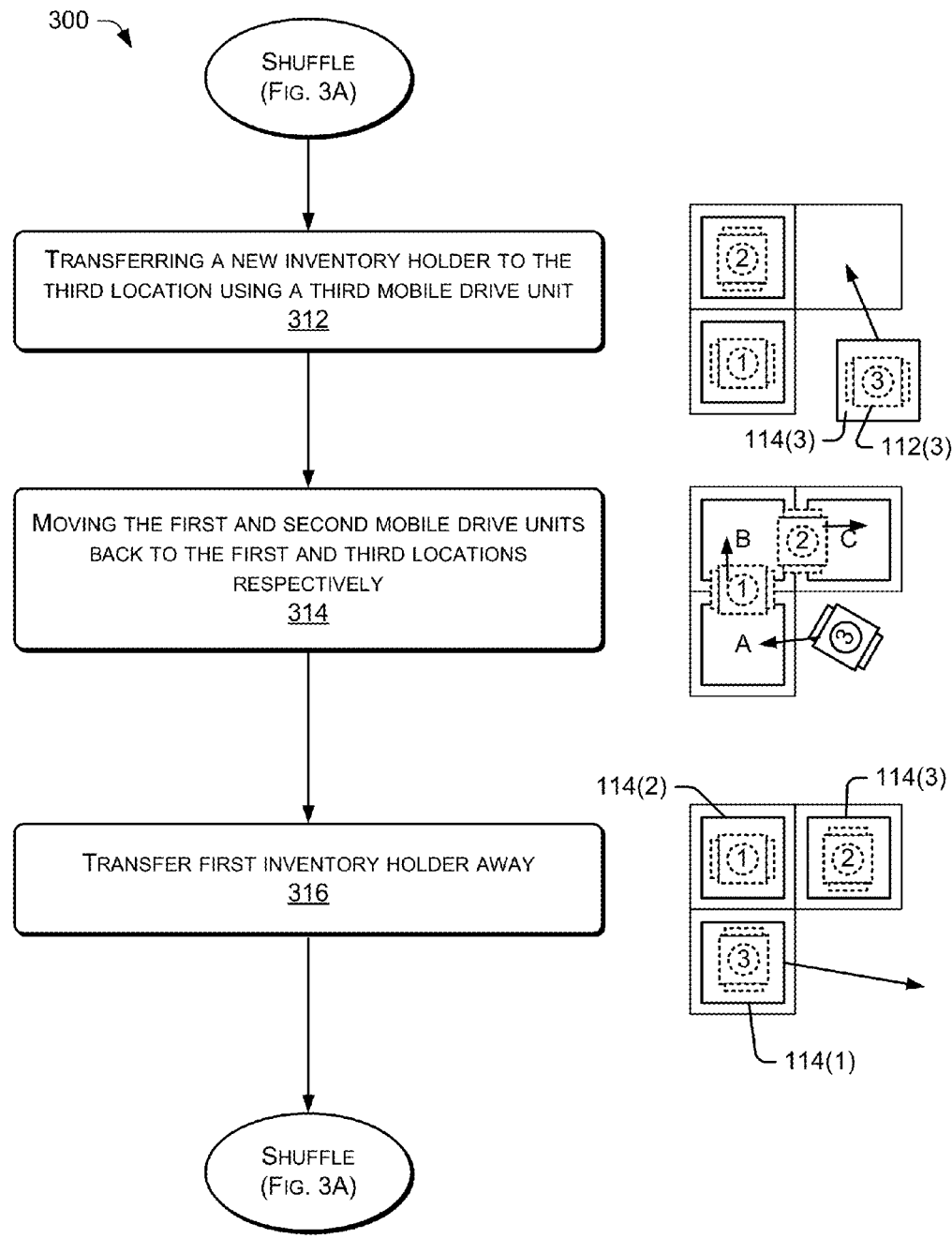

FIGS. 3A and 3B show the basic shuffle process 300 that may be implemented by the inventory system 100. The process is illustrated as a collection of blocks in a logical flow graph. Some of the blocks represent actions taken by the mobile drive unit under the direction of computer-implemented operations performed at the drive unit or the management module. In the context of software-based operations, the blocks represent computer-executable instructions stored on one or more computer-readable storage media that, when executed by one or more processors, direct the mobile drive units to perform the recited acts. The order in which the operations are described is not intended to be construed as a limitation, and any number of the described blocks can be combined in any order or in parallel to implement the processes. It is understood that the following processes may be implemented with other architectures than the inventory system 100 described above.

Adjacent to the blocks, the process 300 includes a pictorial representation of two mobile drive units 112(1) and 112(2) (labeled as "1" and "2" for clarity of illustration) performing the steps of the shuffle process with two inventory holders 114(1) and 114(2) according to the arrangement of FIG. 2. The inventory holders 114 may at times be referenced by letters "A", "B", and "C", for ease of discussion.

At 302, the first mobile drive unit 112(1) repositions the first inventory holder 114(1) from a first location to a second or temporary staging location that is proximal to the first location. In this example, the staging location is immediately adjacent to the first location, but it need not be. Under direction of the management module 110 or under its own initiative, the first mobile drive unit 112(1) is positioned under the inventory holder 114(1), lifts the holder off of the ground, and moves it to the staging location. The first mobile drive unit 112(1) then sets down the inventory holder 114(1) and pauses for further instructions or other steps in the shuffle sequence to occur. This is illustrated in FIG. 3A by the downward movement of the first mobile drive unit 112(1) between adjacent vertically-aligned locations.

In some implementations, the repositioning of 302 may be based, in part, on determining an order set for a plurality of items to be picked from the inventory holders and determining a sequence for the inventory tasks to be performed by the operator to pick each of the plurality of items, at 303. That is, the order set may contain plural orders received from users placing orders for goods to be packaged and shipped. The orders may be for items contained on multiple inventory holders, such as the two holders 114(1) and 114(2) of FIG. 3A. As the orders are queued, a priority or sequence of tasks is generated to coordinate the mobile drive units and operators to fulfill the orders.

At 304, the second mobile drive unit 112(2) repositions the second inventory holder 114(2) from a third location to the first location recently vacated due to repositioning of the first inventory holder 114(1). The third location is another temporary staging location that is also proximal to the first location. This third location is illustrated as being horizontally aligned with the first location, although other proximal arrangements are possible. More specifically, under direction of the management module 110 or under its own initiative, the second mobile drive unit 112(2) awaits for the first mobile drive unit 112(1) to move the first inventory holder 114(1). The second mobile drive unit 112(2) then lifts the second inventory holder 114(2) off of the ground, moves it to the first location, and sets it down. This is illustrated in FIG. 3A by the leftward movement of the second mobile drive unit 112(2) between the adjacent horizontally-aligned locations. At this point, the second mobile drive unit 112(2) pauses for further instructions or other steps in the shuffle sequence to occur.

In some implementations, the system may determine that there would be subsequent tasks involving the first inventory holder. Hence, the inventory holder is not removed to storage but is moved to the staging location for temporary holding until the order requesting items from it comes up in sequence and is ready to be fulfilled by the operator. For instance, suppose the operator picks the items from the second inventory holder and then the next order involves once again picking items from the first inventory holder. The management module determines that the first inventory holder will be used for the subsequent task and directs the mobile drive unit to reposition it close by at the staging location.

At 306, the second mobile drive unit 112(2) repositions the second inventory holder 114(2) from the first location back to the original third location. That is, the second mobile drive unit 112(2) shuffles the second inventory holder 114(2) back to a staging location to vacate the first location adjacent an operator. In other implementations, the second mobile drive unit 112(2) may move the second inventory holder 114(2) to another staging location rather than the previous third location from where it started at act 302.

At 308, the first mobile drive unit 112(1) repositions the first inventory holder 114(1) from the second staging location back to the first location that was just vacated by the second inventory holder 114(2). In this manner, the first inventory holder is returned to the first location for access by the operator. Essentially, the inventory holders 114(1) and 114(2) are now back in the same locations as they were at the start.

At 310, this shuffle process may be repeated as many times as directed to facilitate efficient fulfillment of inventory operations. The dashed line in FIG. 3A reflects this repetitive shuffle process. Once operations with any one of the inventory holders has been fully completed (e.g., items have been entirely picked, the holder has been fully restocked, etc.) or a new inventory holder is to be added to the mix, a replacement phase of the process may be undertaken as represented by the transition to FIG. 3B.

With reference now to FIG. 3B, suppose it is time to deliver a new inventory holder and remove one from the region, resulting in a process transition from the shuffle process of FIG. 3A. At 312, a third mobile drive unit 112(3) (labeled as "3" for clarity of illustration) transfers a new inventory holder 114(3) to the third location recently vacated due to repositioning of the second inventory holder 114(2). In other implementations, the new inventory holder 114(3) may be placed in any unoccupied staging location. The third mobile drive unit 112(3) sets down the third inventory holder 114(3) in the third location and leaves it there to fetch another new inventory holder, or carry away a recently picked inventory holder. The next task for the third mobile drive unit may be dictated by the management module 110 and change to any number of options depending upon the current status of pick lines, inventory, orders, and other inputs that are used to determine the most efficient next use for the third mobile drive unit.

At 314, the two local mobile drive units—units 112(1) and 112(2)—are moved to return the two drive units to the original positions (i.e., the first and third locations). This may be accomplished in different ways. In one approach, the first mobile drive unit 112(1) moves back to the first location while the second mobile drive unit 112(2) concurrently or just previously moves back to the third location, as illustrated in FIG. 3B. In another approach, the first mobile unit 112(1) may move to the third position, while the second mobile drive unit 112(2) stays in the first location. In some cases, both movement techniques may be used at varying times.

At 316, a non-local mobile drive unit, such as transfer drive unit 112(3) may transfer the first inventory holder away from the locations, thereby vacating the second location (i.e., lower adjacent staging location). The first inventory unit 114(1) may be returned to the inventory region, or if items still remain, to another pick station or inventory pier.

At this point in the process, the local mobile drive units 112(1) and 112(2) are ready to repeat the shuffle process with the second and third inventory holders. Accordingly, the process may return to act 302 of FIG. 3A to shuffle the second inventory holder 114(2) away from the pick location and shuffle in the third inventory holder 114(3) into that location to efficiently keep items adjacent to the picker to maximize throughput at the inventory system 100.

It is noted that FIGS. 3A and 3B show two local mobile drive units to implement a shuffle process of two inventory holders among three locations. This may be expanded to other arrangements of multiple drive units per sets of locations. For instance, four local and dedicated drive units may be used to move inventory holders among six adjacent locations, where two of the locations are pick locations and four of the locations are staging locations. This scenario is described below in more detail with reference to FIG. 4. Moreover, in other implementations, just one mobile drive unit may be used to perform the shuffle process. That implementation is described below in more detail with reference to FIG. 5. Additionally, there is no intended correlation among locations, holders, and mobile drive units. For instance, there need not be any one-to-one correlation of local mobile drive units with the inventory holders. The local mobile drive units may be configured to shuffle a larger number of inventory holders. One example scenario is shown and discussed with reference to FIG. 6. It is further noted that the inventory holders need not be grouped together as closely as shown, but could be spaced farther apart. In these cases, the mobile drive units might travel farther to perform the shuffle process.

The shuffle process 300 may be executed in any number of situations, such as shuffling inventory holders up the pick line at the pick station 104, shuffling inventory holders within a set of storage locations in the storage region 102, or shuffling the inventory holders at the inventory pier 106. The shuffle process involves minimum movement of the local mobile drive units 112 to improve efficiency of the inventory system 100.

FIGS. 4A-4M show use of the shuffle process in a scenario 400 to shuffle inventory holders at a pick station 104. As illustrated, the pick station 104 has six predefined locations including a primary set of two pick locations 402(1) and 402(2) and a secondary set of four staging locations 404(1)-404(4). The pick locations 402(1)-402(2) are side-by-side, immediately adjacent to the picker 128. The staging locations 404(1)-404(4) are adjacent to the pick locations, approximately one location removed from the picker 128. Two inventory holders A and B are positioned in two pick locations 402(1) and 402(2), respectively, and two inventory holders C and D are positioned in two staging locations 404(2) and 404(3), respectively. Two staging locations 404(1) and 404(4) are currently empty. A fifth inventory holder E is shown being transferred from the storage region 102 to the pick station 104. It is noted that more or less locations and inventory holders may be arranged at the pick station 104, and this is just one example to illustrate the shuffle process.

Figure 4A:
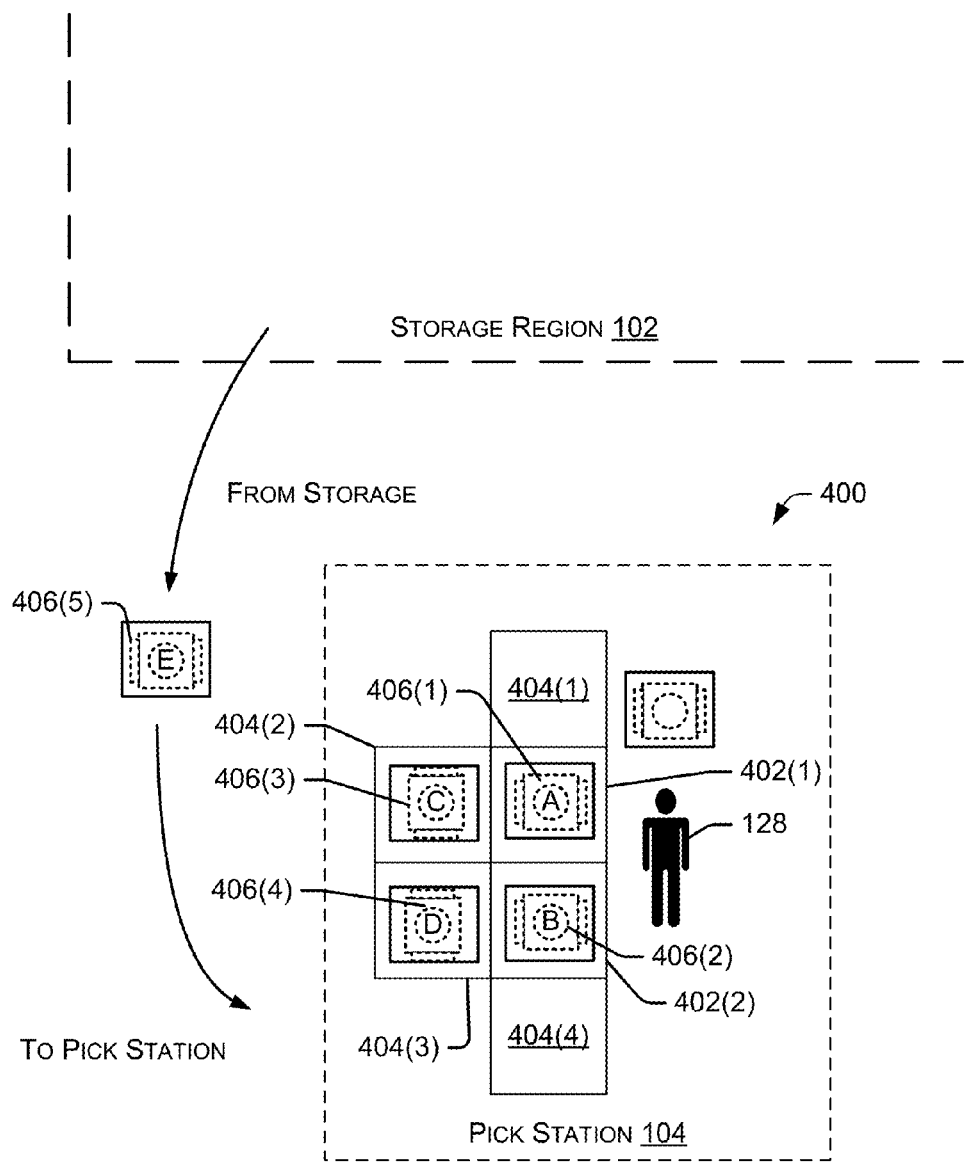
FIGS. 4A-4M present a sequence of illustrations to show use of the shuffle process of FIG. 3A to shuffle inventory holders at a pick station.

Multiple mobile drive units 406 may be used to shuffle the inventory holders among the multiple pick locations and the multiple staging locations at the pick station 104. For discussion purposes, four mobile drive units are dedicated locally at the pick station 104 for providing the efficient shuffling technique. Here, a first mobile drive unit 406(1) is currently at a first pick location 402(1) beneath the inventory holder A, a second mobile drive unit 406(2) is at a second pick location 402(2) beneath the inventory holder B, a third mobile drive unit 406(3) is at a staging location 404(2) beneath the inventory holder C, and a fourth mobile drive unit 406(4) is at a staging location 404(3) beneath the inventory holder D. While four mobile drive units are shown, in other implementations, one or more mobile drive units may be used to move the inventory holders among the pick locations 402 and staging locations 404. Further, one or more other drive units are used to bring inventory holders to, and remove them from, the staging locations 404. In FIG. 4A, for example, a mobile drive unit 406(5) retrieves a new inventory holder E from a place separate from the pick station 104, such as the storage region 102, and deposits it at the pick station 104.

Figure 4B:
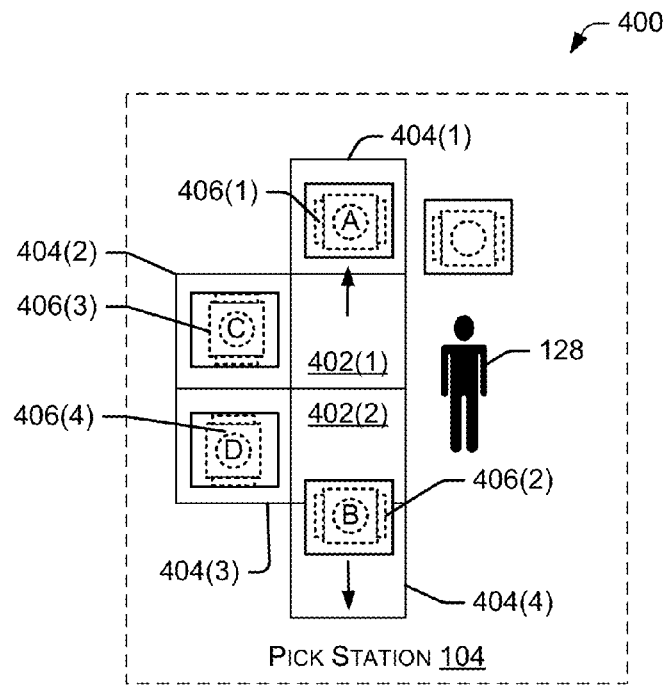

In FIG. 4B, the first mobile drive unit 406(1) repositions the first inventory holder A from the first pick location 402(1) to an unoccupied first staging location 404(1). The operator 128 has just picked items from the first inventory holder A and is now ready to pick items from another inventory holder. The first inventory holder A may still contain items of interest in the future, so it is temporarily moved to a staging location. Once it is fully picked or otherwise completed, the first inventory holder may be removed for restocking if fully picked, or maneuvered to another location (e.g., storage, pick station, pier, shipping station, etc.) for subsequent usage as is described below in more detail. In this illustration, the first staging location 404(1) is juxtaposed with the first pick location 402(1).

Simultaneously, or sequentially, the second mobile drive unit 406(2) repositions the second inventory holder B from the second pick location 402(2) to another unoccupied staging location 404(4). Likewise, this inventory holder B has just recently been picked by the operator 128, and is being temporarily moved to allow access to another inventory holder. Here, the second staging location 404(4) is juxtaposed with the second pick location 402(2). Following these movements, the two pick locations 402(1) and 402(2) are vacated and temporarily empty, perhaps at the same time if the drive units perform concurrently, or at differing times if the drive units perform sequentially.

Figure 4C:
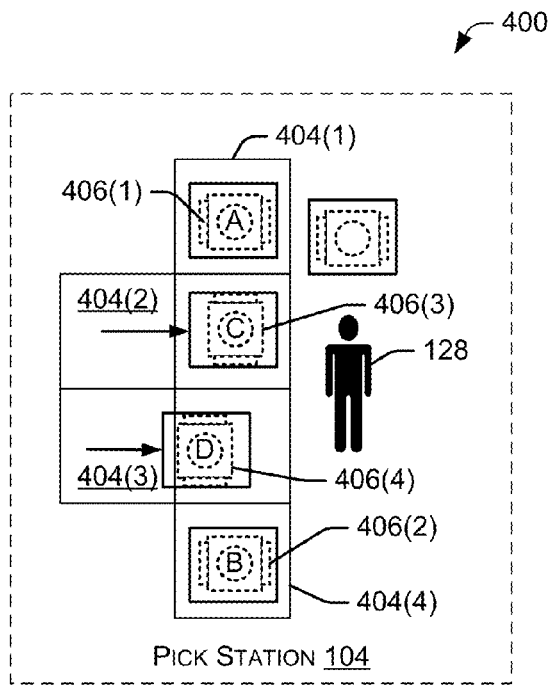

In FIG. 4C, the third mobile drive unit 406(3) repositions the third inventory holder C from a staging location 404(2) to the first pick location 402(1) that was recently vacated when the first mobile drive unit 406(1) moved the first inventory holder A. This third inventory holder C represents a new inventory holder that holds items of interest to next be handled by the operator 128. In this illustration, the staging location 404(2) is adjacent to the left of the first pick location 402(1). Simultaneously, or sequentially, the fourth mobile drive unit 406(4) repositions the fourth inventory holder D from the staging location 404(3) to the second pick location 402(2) recently vacated by the second inventory holder B. This fourth inventory holder D also represents a new inventory holder that holds items of interest to next be handled by the operator 128. After these movements, the two pick locations 402(1) and 402(2) are once again filled with new inventory holders that are readily accessible by the operator 128. Further, the two staging locations 404(2) and 404(3) are now vacated and temporarily empty.

Figure 4D:
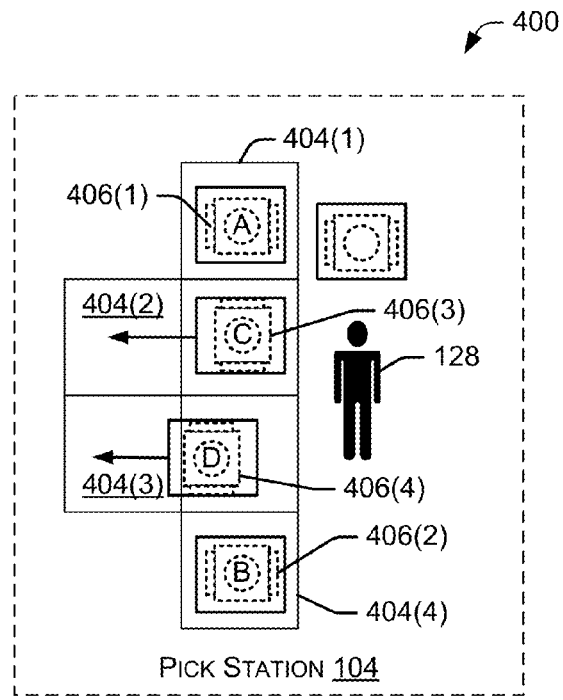

Thereafter, in FIG. 4D, the third mobile drive unit 406(3) shuffles the third inventory holder C back to the staging location 404(2) from the first pick location 402(1). In other implementations, the third inventory holder C may be moved to other unoccupied staging locations. Similarly, the fourth mobile drive unit 406(4) repositions the fourth inventory holder D from the second pick location 402(2) back to the staging location 404(3). After these movements, the two pick locations 402(1) and 402(2) are once again vacant.

Figure 4E:
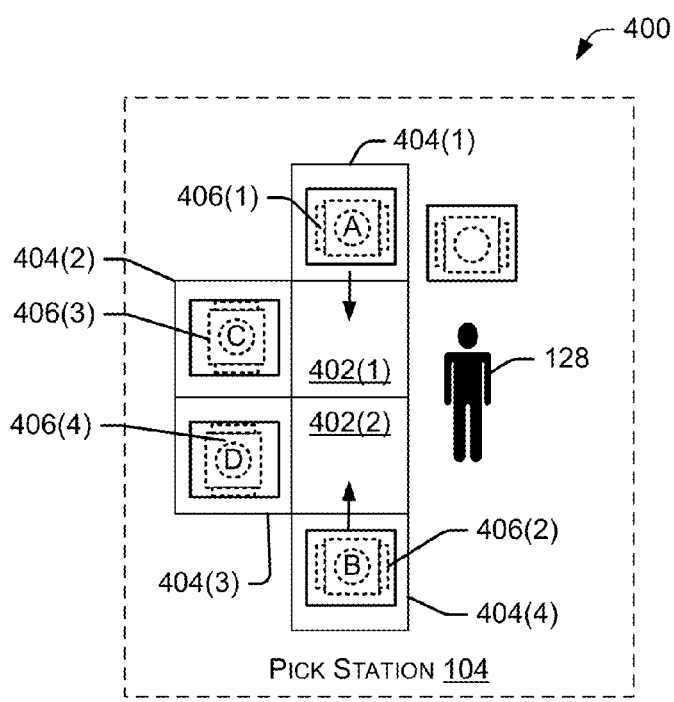

In. FIG. 4E, the first mobile drive unit 406(1) repositions the first inventory holder A back into the first pick location 402(1) from the first staging location 404(1). In this manner, the first inventory holder is shuffled back to be in front of the operator 128. Similarly, the second mobile drive unit 406(2) repositions the second inventory holder B back into the second pick location 402(2) from the temporary staging location 404(4). Following these movements, the four inventory holders are shuffled back to the original positions as shown in FIG. 4A.

Figure 4F:
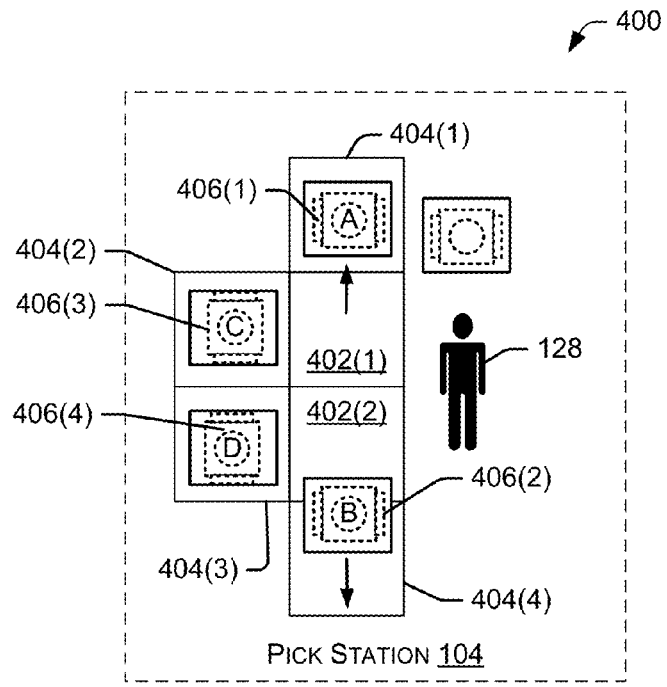
Figure 4G:
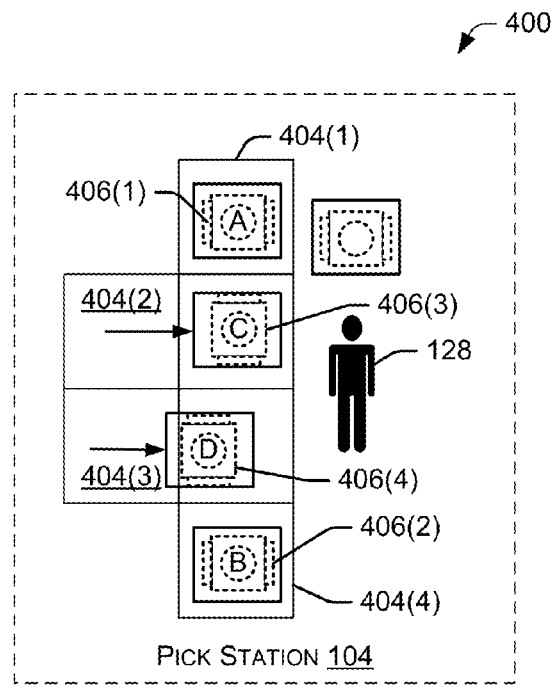
Figure 4H:
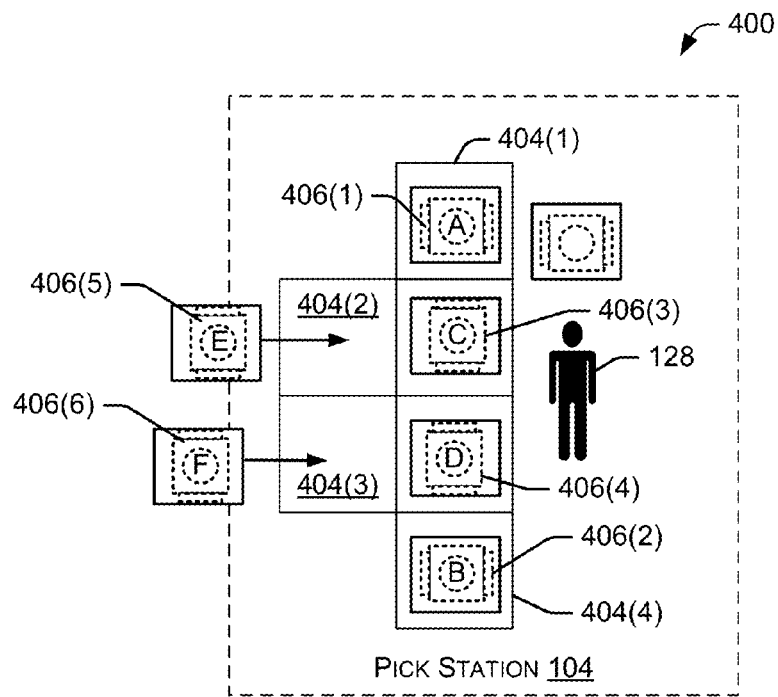

FIGS. 4F and 4G repeat the operations discussed above with respect to FIGS. 4B and 4C, respectively. That is, in FIG. 4F, the first mobile drive unit 406(1) repositions the first inventory holder A from the first pick location 402(1) to the unoccupied first staging location 404(1). The second mobile drive unit 406(2) repositions the second inventory holder B from the second pick location 402(2) to the staging location 404(4). In FIG. 4G, the third mobile drive unit 406(3) repositions the third inventory holder C from the staging location 404(2) back into the first pick location 402(1). The fourth mobile drive unit 406(4) once again repositions the fourth inventory holder D from the staging location 404(3) back into the second pick location 402(2).

The operations described above may be repeated as many times as desired to shuffle the four inventory holders back and forth to the two pick locations. For continuing discussions, suppose that the first two inventory holders are no longer needed at the pick station. Accordingly, in FIG. 4H, other non-local mobile drive units 406(5) and 406(6) move new inventory holders E and F into vacant staging locations 404(2) and 404(3). At this point in the process, all six locations are currently occupied with inventory holders A-F.

Figure 4I:
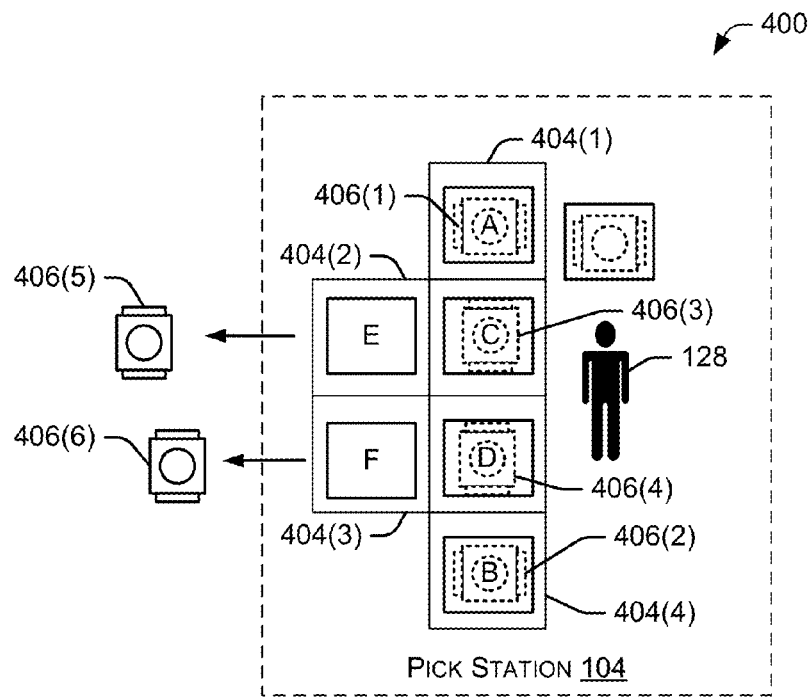

In FIG. 4I, the non-local mobile drive units 406(5) and 406(6) leave the inventory holders E and F in the on-deck staging locations 404(2) and 404(3). That is, each of the non-local mobile drive units lower the inventory holders to the ground, disengage the head, and move out from beneath the inventory holders. The non-local mobile drive units 406 (5) and 406(6) may then leave the pick station 104 or be directed to wait and take away the completed inventory holders A and B.

Figure 4J:
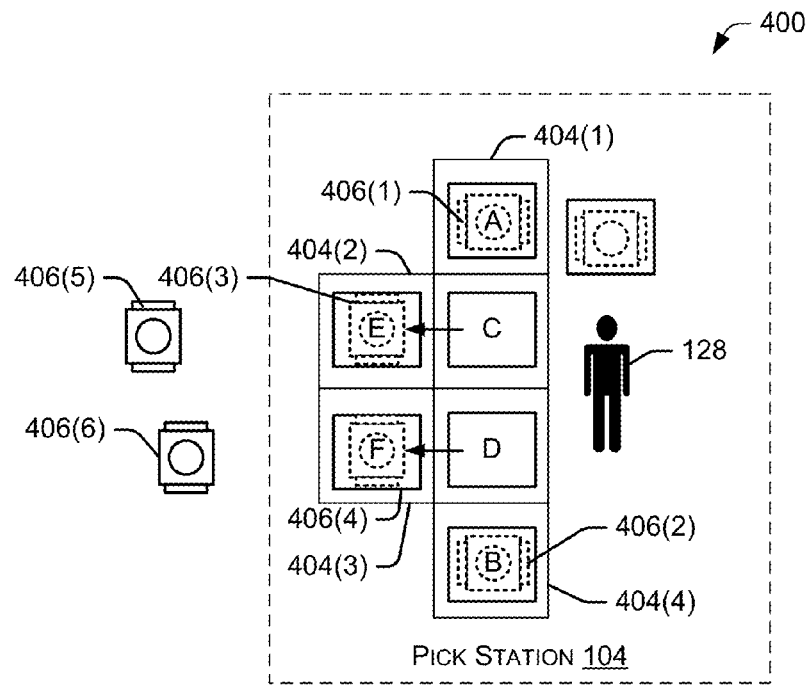

In FIG. 4J, the third and fourth mobile drive units 406(3) and 406(4) decouple from the inventory holders C and D, and move back to the staging locations 404(2) and 404(3), beneath the new inventory holders E and F. The drive units may move together or at different times from one another.

Figure 4K:
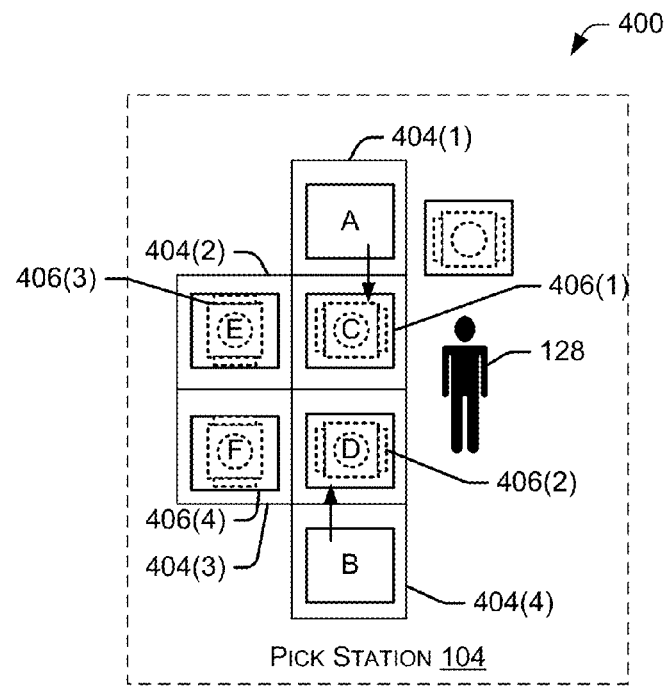

In FIG. 4K, the first and second mobile drive units 406(1) and 406(2) decouple from the inventory holders A and B, and move back to the pick locations 402(1) and 402(2), beneath the next inventory holders C and D. Again, the drive units may be directed to move together or at different times from one another.

Figure 4L:
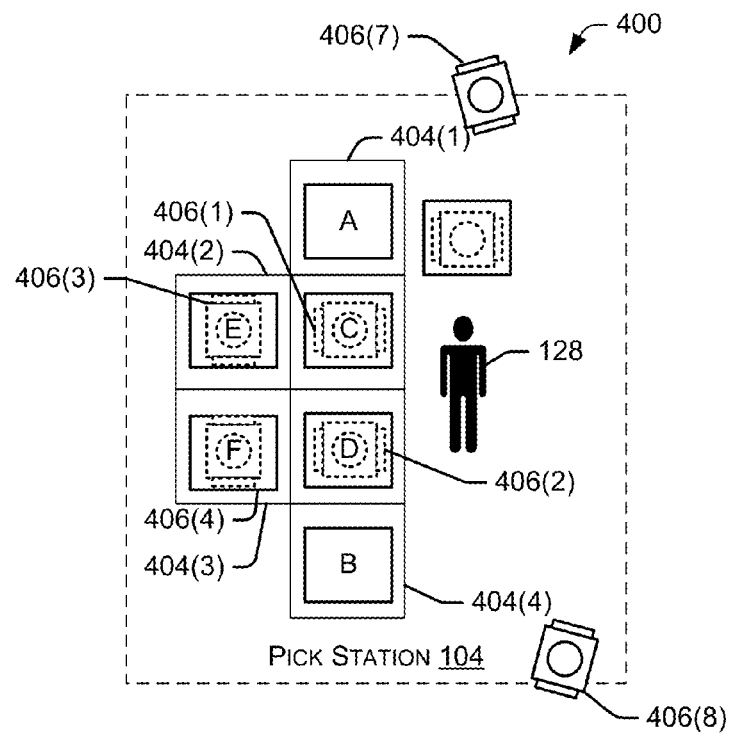

In FIG. 4L, two non-local mobile drive units arrive at the pick station 104 and are moved to the staging locations 404(1) and 404(4) beneath the completed inventory holders A and B. In this example, two new mobile drive units 406(7) and 406 (8) are used. In other implementations, the previous non-local drive units 406(5) and 406(6) that delivered the new inventory holders E and F may be directed to remove the completed inventory holders A and B.

Figure 4M:
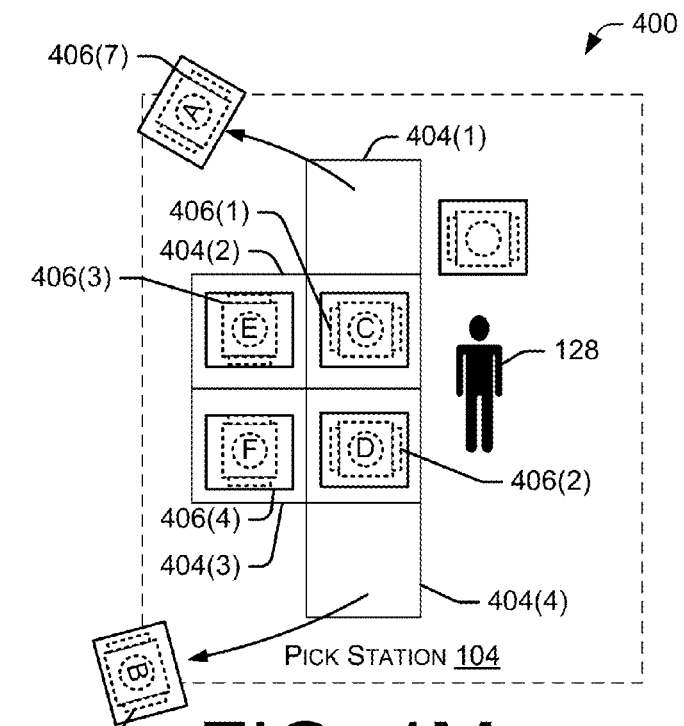

In FIG. 4M, the two non-local mobile drive units 406(7) and 406(8) engage the inventory holders A and B, lift them off the ground, and transport them away from the pick station 104. The operation of these two mobile drive units 406(7) and 406(8) may be coordinated to remove the completed inventory holders A and B at roughly the same time, or on an as-needed basis depending upon when the inventory holders are completed by the operator 128.

In the scenario of FIGS. 4A-4M, the shuffle process enables multiple local drive units to efficiently move inventory holders back and forth to positions beside the operators. Further, the process allows the mobile drive units to slide out completed inventory holders while sliding in the next set of inventory holders. One benefit of this process is that the inventory holders A-D may be prioritized by location, with the current inventory holders A and B in the pick locations 402(1) and 402(2) being given highest priority and the next inventory holders C and D in the staging locations 404(2) and 404(3) being next in the priority queue. During shuffle, the next inventory holders C and D are moved up in the priority, and the new inventory holders E and F are placed in the on-deck locations.

It is noted that in some situations, additional staging locations may be provided to enlarge the priority queue. That is, additional staging locations may be provided next to the staging locations 404(2) and 404(3). Further, the pattern may be reversed with the vertically-aligned staging locations 404 (1) and 404(4) holding the on-deck or next-in-line inventory holders and the other horizontally-aligned staging locations 404(2) and 404(3) temporarily holding the recently completed inventory holders.

Figure 5:
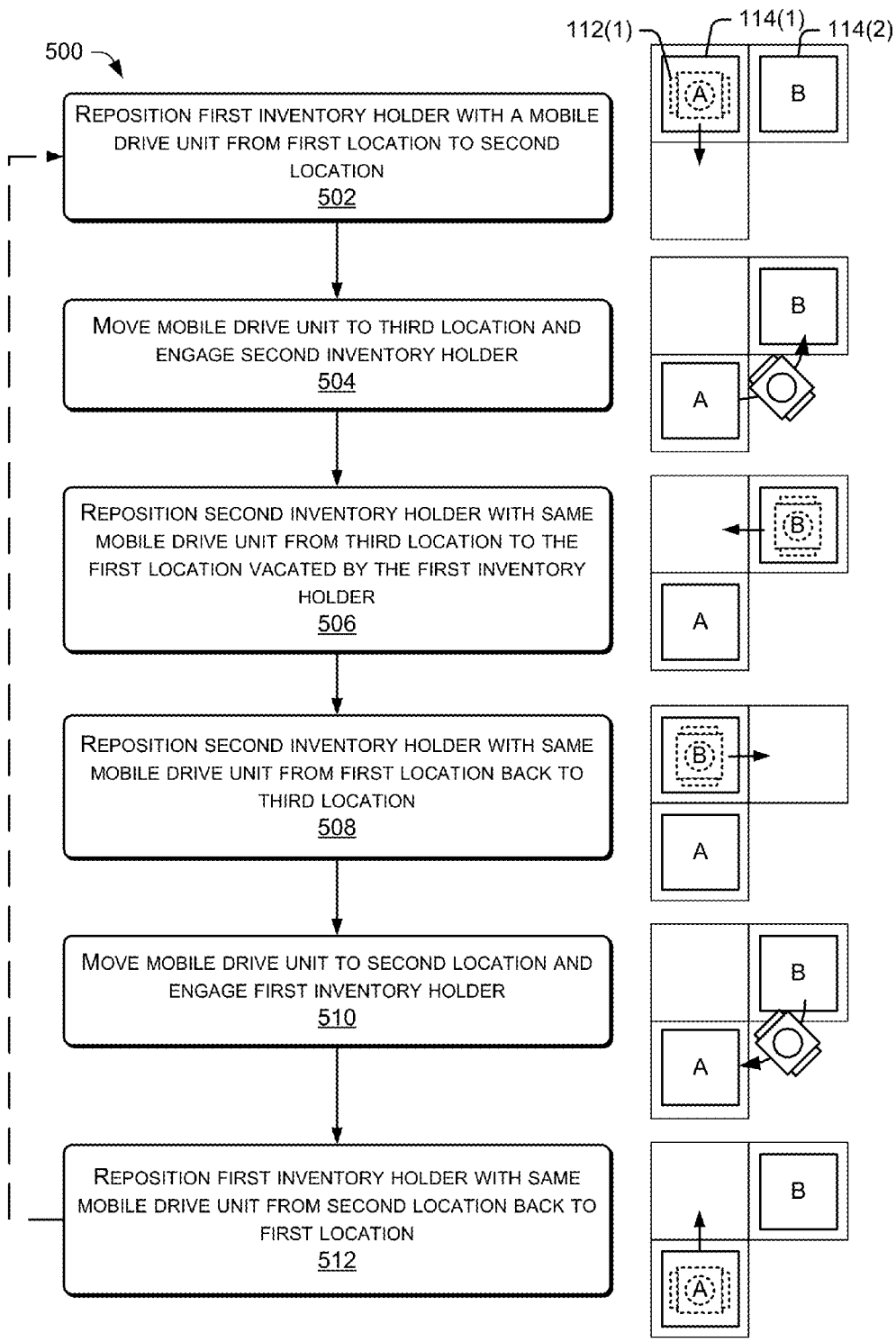
FIG. 5 is a flow diagram illustrating an example shuffle process that may be implemented using a single mobile drive unit to shuffle inventory holders among locations at a station.

FIG. 5 shows an example shuffle process 500 that may be implemented using a single mobile drive unit to shuffle inventory holders among locations at a station. As above, the process is illustrated as a collection of blocks in a logical flow graph. Adjacent to the blocks, the process 300 includes a pictorial representation of a single mobile drive unit 112 performing the steps of the shuffle process with two inventory holders 114(1) and 114(2). The inventory holders 114 are referenced by letters "A" and "B" for ease of discussion.

At 502, the sole mobile drive unit 112 repositions the first inventory holder A from a first location to a second or staging location that is proximal to the first location. At 504, the mobile drive unit 112 is moved to a third location and engages the second inventory holder B. At 506, the mobile drive unit 112 repositions the second inventory holder B from the third location to the first location vacated by the first inventory holder A. In this way, the second inventory holder B is now placed in the prominent position for the operator.

At 508, the same mobile drive unit 112 repositions the second inventory holder B from the first location back to the third location. At 510, the mobile drive unit 112 disengages from the second inventory holder B, moves from the third location to the second location, and engages the first inventory holder B. At 512, the mobile drive unit 112 repositions the first inventory holder A from a second location back into the first location. This shuffle process may be repeated as indicated by the dashed flow loop.

FIG. 6 shows another example scenario 600 at a station where multiple drive units are used to shuffle plural inventory holders among many locations. In this illustration, there are four primary locations 602 adjacent to an operation zone 604 worked by one or more operators, such as operator 606. Proximal to the primary locations are many secondary locations 608 arranged in no particular pattern. Several mobile drive units 112 are shown moving inventory holders 114 among the locations.

Generally, the mobile drive units 112 may perform a shuffle process that moves the inventory holders 114 back and forth between the primary locations and the secondary locations. With the shuffle process, each inventory holder is placed in a primary location by the operator 606 when being operated on, then temporarily moved to a secondary location, and later shuffled back to the primary location. In this way, the inventory holders are kept close and made ready on an as-needed basis to improve efficiency and throughput of the inventory process.

Figure 7:
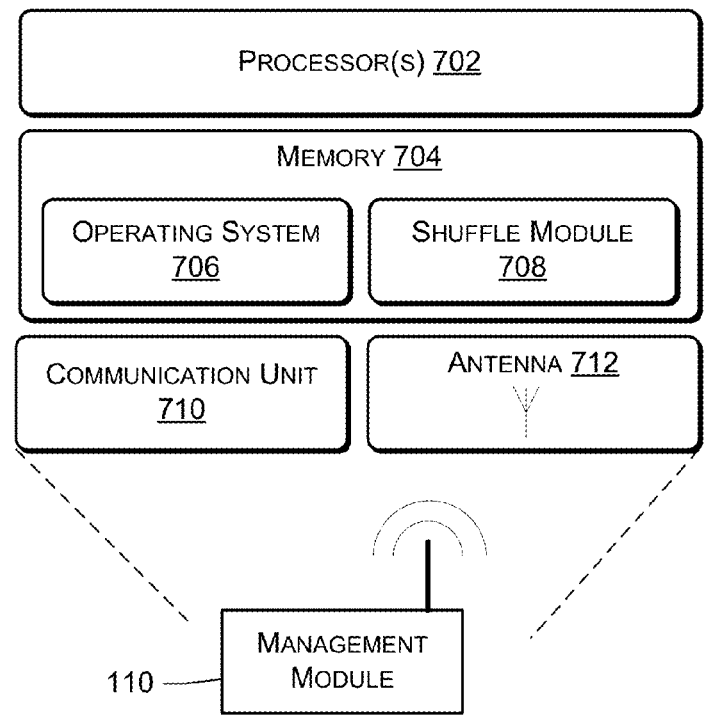
FIG. 7 is a block diagram of select components in a management module used in the inventory system of FIG. 1 to control operation of the mobile drive units, among other parts of the system.

FIG. 7 shows the management module 110 from the inventory system 100 of FIG. 1. The management module 110 includes one or more processors 702 and memory 704. The processor(s) 702 are configured to execute instructions, such as those instructions stored in memory 704, or in other memory accessible to the processor(s) 702, such as storage in cloud-based resources. The memory 704 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules, such as instructions, datastores, and so forth may be stored within the memory 704 and configured to execute on a processor(s) 702. An operating system module 706 is configured to manage hardware and services within and coupled to the management module 110 for the benefit of other components. A shuffle module 708 is configured to direct the mobile drive units 112, 406 to perform the shuffle process described herein at various times and locations throughout the inventory system. The shuffle module 708 may provide a list of tasks to fully perform the shuffle process, or may provide instructions as-needed for the mobile drive units to shuffle the inventory holders. In that way, the management module 110 may either micro manage each movement of the mobile drive units throughout a shuffle process, or may simply provide a plan and timing for the mobile drive units to carry out on their own independently of further instructions. In this latter scenario, each mobile drive unit 112 may be equipped with hardware and/or software components that are configured to enable the unit to perform the shuffle technique independently of the management module 110, as will be described in more detail with reference to FIG. 8.

The management module 110 further includes a communication unit 710 to communicate with the mobile drive units or with other computing devices. The communication unit 710 enables access to one or more types of network, including wired and wireless networks. More generally, the coupling between the management module 110 and any components in the inventory system may be via wired technologies, wireless technologies (e.g., RF, cellular, satellite, Bluetooth, etc.), or other connection technologies. When implemented as a wireless unit, the communication unit 710 uses an antenna 712 to send and receive wireless signals.

Figure 8:
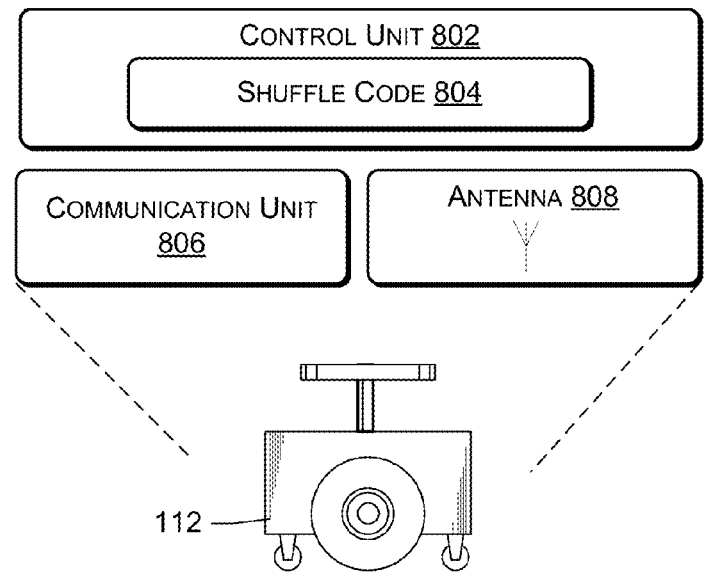
FIG. 8 is a block diagram of select components in a mobile drive unit used in the inventory system of FIG. 1.

FIG. 8 shows select computing components that may be implemented in the mobile drive unit 112, 406. The computing components may include a control unit 802 that is formed using one or more of generally computing hardware, specially-dedicated hardware, software, or firmware. The control unit 802 may execute shuffle code 804 that enables the mobile drive unit 112 to perform the shuffle process described herein. The shuffle code may be independently executed by the mobile drive unit 112, or alternatively through interaction with instructions received from the management module 110.

The mobile drive unit 112 may further be equipped with a communication unit 806 to communicate with other mobile drive units and/or with the management module 110. The communication unit 806 enables access to one or more types of network, including wired and wireless networks. When implemented as a wireless unit, the communication unit 806 uses an antenna 808 to send and receive wireless signals.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
positioning multiple inventory holders at corresponding multiple locations of a pick station of an inventory system, the multiple locations including multiple pick locations and multiple staging locations;
shuffling the multiple inventory holders among the multiple pick locations and the multiple staging locations of the pick station using multiple mobile drive units, the shuffling comprising:
repositioning, using a first mobile drive unit, a first inventory holder from a first pick location of the multiple pick locations to a first staging location of the multiple staging locations;
repositioning, using a second mobile drive unit, a second inventory holder from a second staging location of the multiple staging locations to the first pick location;
repositioning, using a third mobile drive unit, a third inventory holder from a second pick location of the multiple pick locations to the second staging location;
repositioning, using a fourth mobile drive unit, a fourth inventory holder from a third staging location of the multiple staging locations to the second pick location;
removing the first inventory holder and the third inventory holder from the pick station; and
retrieving a fifth inventory holder and depositing the fifth inventory holder in one of the first or second staging locations.

2. The method of claim 1, further comprising:
moving the fourth mobile drive unit back to the third staging location;
moving the second mobile drive unit from the first pick location back to the second staging location; and
moving the first mobile drive unit from the first staging location back to the first pick location.

3. The method of claim 1, wherein the removing of the first inventory holder and the third inventory holder is performed by one or more additional mobile drive units that are different than the first, second, third, and fourth mobile drive units.

4. The method of claim 1, wherein the first and second pick locations are closest to a picker and the first and second staging locations are farther from the picker than the first and second pick locations;
wherein the first staging location is adjacent to one of the first pick location and the second pick location; and
wherein the second staging location is adjacent to the other of the first pick location and the second pick location.

5. The method of claim 1, further comprising:
retrieving a sixth inventory holder and depositing the sixth inventory holder in the other of the first or second staging locations.

6. A method comprising:
positioning a first inventory holder at a first location;
positioning a second inventory holder at a second location adjacent to the first location;
repositioning, using a first mobile drive unit, the first inventory holder from the first location to a third location proximate the first location; and
repositioning, using a second mobile drive unit, the second inventory holder from the second location to the first location; and
moving the second mobile drive unit from the first location back to the second location; and
moving the first mobile drive unit from the third location back to the first location;
wherein the first location, second location, and third location comprise a pick station.

7. The method of claim 6, further comprising:
moving the second mobile drive unit to the third location; and
transferring, using a third mobile drive unit, a third inventory holder to the second location.

8. The method of claim 7, further comprising:
transporting, with the third mobile drive unit, the first inventory holder from the third location to a fourth location that is outside the pick station;
repositioning, using the first mobile drive unit, the second inventory holder from the first location to the third location; and
repositioning, using the second mobile drive unit, the third inventory holder from the second location to the first location.

9. The method of claim 6, further comprising:
transporting, using a third mobile drive unit, the first inventory holder to a fourth location that is outside the pick station.

10. The method of claim 9, further comprising:
moving the second mobile drive unit to the third location; and
transferring, using a fourth mobile drive unit, a fourth inventory holder to the second location.

11. The method of claim 10, further comprising:
moving the fourth mobile drive unit to a fifth location that is outside the pick station; and
repositioning the second mobile drive unit from the third location to the second location.

12. The method of claim 6, wherein the first mobile drive unit and the second mobile drive unit are moving at the same time at least part of the time required to move the second mobile drive unit from the first location back to the second location and the first mobile drive unit from the third location back to the first location.

13. The method of claim 6, wherein the second mobile drive unit completes moving from the first location to the second location prior to the first mobile drive unit moving from the third location to the first location.

14. An inventory system comprising:
a plurality of mobile drive units that is remotely controllable to move inventory holders about a warehouse;
a region within the warehouse comprising at least a first pick location, a first staging location, and a second staging location; and
a management module configured to direct movement of the plurality of mobile drive units to move the inventory holders throughout the warehouse, the management module being further configured to direct at least first and second mobile drive units of the plurality of mobile drive units to perform a shuffle process within the region of the warehouse, the shuffle process comprising:
directing the first mobile drive unit to reposition a first inventory holder from the first pick location, where items are placed into or removed from the first inventory holder, to the first staging location proximate the first pick location;
directing the second mobile drive unit to reposition a second inventory holder from the second staging location to the first pick location;
returning the second mobile drive unit from the first pick location to the second staging location; and
returning the first mobile drive unit from the first staging location to the first pick location.

15. The inventory system of claim 14, wherein the management module is further configured to direct a third mobile drive unit to remove the first inventory holder from the region of the warehouse.

16. The inventory system of claim 15, wherein the management module is further configured to direct a fourth mobile drive unit to deliver a third inventory holder to the first staging location.

17. The inventory system of claim 14, wherein the management module is further configured to:
direct the second mobile drive unit to reposition from the second staging location to the first staging location; and
direct a third mobile drive unit to deliver a third inventory holder to the second staging location.

18. The inventory system of claim 14 wherein the management module is further configured to:
direct the second mobile drive unit to reposition from the second staging location to the first staging location;
direct the first mobile drive unit to reposition the second inventory holder from the first pick location to the second staging location; and
direct the second mobile drive unit to move the first inventory holder to the first pick location.

19. The inventory system of claim 18 wherein the management module is further configured to:
direct the first mobile drive unit to reposition from the second staging location to the first staging location; and
direct a third mobile drive unit to remove the second inventory holder from the region of the warehouse.

20. The inventory system of claim 14 wherein the management module is further configured to:
direct a third mobile drive unit to deliver a third inventory holder to an area proximate the second staging location; and
direct the second mobile drive unit to reposition the third inventory holder from the area proximate the second staging location to the second staging location.

* * * * *